(12) United States Patent
Anderson et al.

(10) Patent No.: US 7,793,319 B2
(45) Date of Patent: Sep. 7, 2010

(54) SYSTEM AND METHOD FOR IMPROVED CHANNEL SURFING

(75) Inventors: Glen J. Anderson, Sioux City, IA (US); Edward G. Yong, Sioux City, IA (US)

(73) Assignee: Gateway, Inc., Irvine, CA (US)

( * ) Notice: Subject to any disclaimer, the term of this patent is extended or adjusted under 35 U.S.C. 154(b) by 1607 days.

(21) Appl. No.: 10/832,579

(22) Filed: Apr. 27, 2004

(65) Prior Publication Data

US 2005/0240967 A1    Oct. 27, 2005

(51) Int. Cl.
*H04N 7/10* (2006.01)
*H04N 7/16* (2006.01)
*H04N 5/91* (2006.01)

(52) U.S. Cl. .......................... 725/32; 725/151; 386/46

(58) Field of Classification Search .................. 725/14, 725/94
See application file for complete search history.

(56) References Cited

U.S. PATENT DOCUMENTS

| | | | |
|---|---|---|---|
| 5,194,954 A | | 3/1993 | Duffield |
| 5,561,457 A | * | 10/1996 | Cragun et al. ............... 725/137 |
| 5,621,454 A | * | 4/1997 | Ellis et al. ..................... 725/22 |
| 5,786,869 A | | 7/1998 | Baek et al. |
| 6,198,513 B1 | | 3/2001 | Cherrick |
| 6,285,414 B1 | | 9/2001 | Chilamakuri |
| 6,505,346 B2 | | 1/2003 | Saib et al. |
| 6,522,342 B1 | | 2/2003 | Gagnon et al. |
| 6,601,237 B1 | | 7/2003 | Ten Kate et al. |
| 6,788,882 B1 | * | 9/2004 | Geer et al. ................... 386/116 |
| 7,080,394 B2 | * | 7/2006 | Istvan et al. .................... 725/43 |
| 7,237,250 B2 | * | 6/2007 | Kanojia et al. ................ 725/36 |
| 2002/0083441 A1 | * | 6/2002 | Flickinger et al. ............. 725/32 |
| 2003/0011716 A1 | * | 1/2003 | Vogel .......................... 348/633 |
| 2003/0103627 A1 | * | 6/2003 | Nierzwick et al. .......... 380/240 |
| 2003/0123841 A1 | * | 7/2003 | Jeannin ........................ 386/46 |
| 2004/0028066 A1 | * | 2/2004 | Quanbeck et al. ........... 370/412 |
| 2004/0155986 A1 | * | 8/2004 | Horita et al. ................ 348/731 |
| 2005/0154946 A1 | * | 7/2005 | Mitbander et al. .......... 714/724 |
| 2005/0229221 A1 | * | 10/2005 | Kerofsky et al. ............. 725/100 |

OTHER PUBLICATIONS

Program Information Bar—www.halfbakery.com/idea/program_20information_20bar.
Replay TV Drops Feature—by Eric A. Taub, New York Times, Jul. 21, 2003.
Replay TV Axes Commercial-Skipping Feature—by Mark Hachman, Jun. 10, 2003—www.extremetech.com/article2/0.3973,1124046,00.asp.
Tips and tricks: Get to Know Your TiVo Remote—www.tivo.com/4.4.asp.

* cited by examiner

*Primary Examiner*—Brian T Pendleton
*Assistant Examiner*—Jean D Saint Cyr
(74) *Attorney, Agent, or Firm*—WPAT, P.C.; Anthony King

(57) ABSTRACT

Systems and methods for navigating through multiple channels of broadcast content to locate channels that are running programs of interest include monitoring a plurality of channels of baseband channel information to detect commercials and commercial segments, buffering the baseband channel information for at least one channel; and switching the channel feed for a broadcast receiver to the buffered baseband channel information whenever the receiver is changed to a channel in which commercials or commercial segments are detected.

42 Claims, 4 Drawing Sheets

US 7,793,319 B2

SYSTEM AND METHOD FOR IMPROVED CHANNEL SURFING

TECHNICAL FIELD

The present invention relates in general to systems and methods for receiving television, radio, and streaming media, and in particular to systems and methods for efficiently and rapidly navigating through multiple channels of broadcast content and information in order to locate channels that are running programs of interest.

BACKGROUND

In the first few decades of commercial television broadcasting, viewers were provided with a limited selection of broadcast programming on a handful, at best, of over-the-air channels. Broadcasters and advertisers quickly discovered that viewers could be depended on to suffer through a great many annoying, repetitive, shouting, and sometimes insulting commercial interruptions before they were irritated enough to rise out of their chairs, walk over to the set and attempt to tune the receiver to another channel. And the effort was not likely to be rewarded since other channels' programming was often equally annoying. It is not surprising that Federal Communications Commission Chairman Newton Minnow observed in his address to Congress in 1961 that commercial broadcast television had come to resemble a "vast wasteland." Viewers seemed destined to put up with it.

By the mid 1980's however, modern remote controllable phase lock loop tuning systems provided viewers with the ability to effortlessly sequence through the channels at the touch of a button. The balance had shifted in favor of the viewer and so called "channel surfing" soon became widespread. Now, even the slightest annoyance could provoke viewers to jump channels. Increasingly, viewers subscribed to broadband cable or satellite broadcast systems, lured by the promise of finding better programming in the hundreds of channels of broadcast content.

Although viewers are no longer captive to a limited selection of channels, they have discovered that having access to a vast number of channels provides no assurance they will easily find something worth watching. If anything, the amount of bandwidth devoted to commercials has increased disproportionately with the number of channels, and some broadcasters have resorted to increased violence and lurid sexual content in an effort to ensnare an increasingly impatient and fragmented audience. As a result, viewers find themselves navigating through broadcast content that is qualitatively still a "vast wasteland" as before, but on a much grander scale. Moreover, some broadcasters have begun anticompetitive programming practices in order to discourage channel surfing, such as synchronizing the start of commercial segments with those of other channels and heavy rotation or simultaneous broadcast of the same commercials on multiple channels. While such practices may discourage channel surfing to some extent, they also prevent viewers from discovering that they might prefer a competing channels' programs because synchronized commercials are always running when the viewer changes channels.

Although some viewers have resorted to prerecording favorite programs in order to skip over annoying and offensive content during playback, many viewers would still prefer the spontaneous and random discovery opportunities afforded by channel surfing if the level of annoyance could be kept to a minimum.

SUMMARY

In general, in one aspect, a system for navigating through multiple channels of broadcast content to locate channels that are running programs of interest includes an input port to receive a broadband source comprising multiple channels of broadcast content, a plurality of auxiliary tuners coupled to the input port to select and demodulate channels of broadcast content and to output baseband information for the channels, a commercial detector coupled to the baseband information of at least one channel, the commercial detector to provide a commercial status signal to indicate whether a commercial segment is running on the at least one channel, a channel buffer to provide a buffered feed of the baseband channel information of the at least one channel, an output port, and a switch to selectively couple the buffered feed of the baseband channel information for the at least one channel to the output port in response to the commercial status signal indicating a commercial segment is running on the at least one channel.

In general, in another aspect, a method for improved channel surfing, includes monitoring a plurality of channels of baseband channel information to detect commercials, buffering the baseband channel information for at least one channel, and switching the channel feed for a broadcast receiver to the buffered baseband channel information whenever the receiver is changed to a channel in which commercials are detected.

In general, in yet another aspect, a broadcast receiver, includes a plurality of auxiliary tuners to select and demodulate channels of broadcast content from a multichannel broadband source and to output baseband information for the channels, a commercial detector coupled to the baseband information of at least one channel, the commercial detector to provide a commercial status signal to indicate whether a commercial segment is running on the at least one channel, a channel buffer to provide a buffered feed of the baseband channel information for the at least one channel, a primary tuner to select and demodulate a channel from the multichannel broadband source and to provide a primary feed of baseband channel information, and a switch to selectively couple the buffered feed of the baseband channel information to replace the primary feed of baseband channel information in response to a commercial status signal indicating that a commercial is running on a channel to which the primary tuner has been changed.

In general, in yet another aspect, an apparatus includes a scanning tuner to selectively receive and demodulate a plurality of broadcast channels and to provide baseband channel information for the selected channels, a commercial detector coupled to the baseband channel information for the selected channels to distinguish between commercial segments and regular programming and to provide commercial status signals for the selected channels, and a register to record commercial status information comprising the commercial status signals.

In general, in yet another aspect, a program included on a storage medium tangibly embodying program instructions for improved channel surfing includes instructions operable to cause at least one programmable processor to provide an auxiliary tuner configured to receive and demodulate a plurality of broadcast channels from a broadband source and to output baseband channel information for the channels, to buffer the baseband channel information for at least one channel, to detect and distinguish between commercial segments and regular programming in the baseband channel information for the channels, and to substitute the buffered baseband channel information for baseband channel information for the channel provided to a broadcast receiver when a commercial segment is detected.

DETAILED DESCRIPTION

Figure 1:
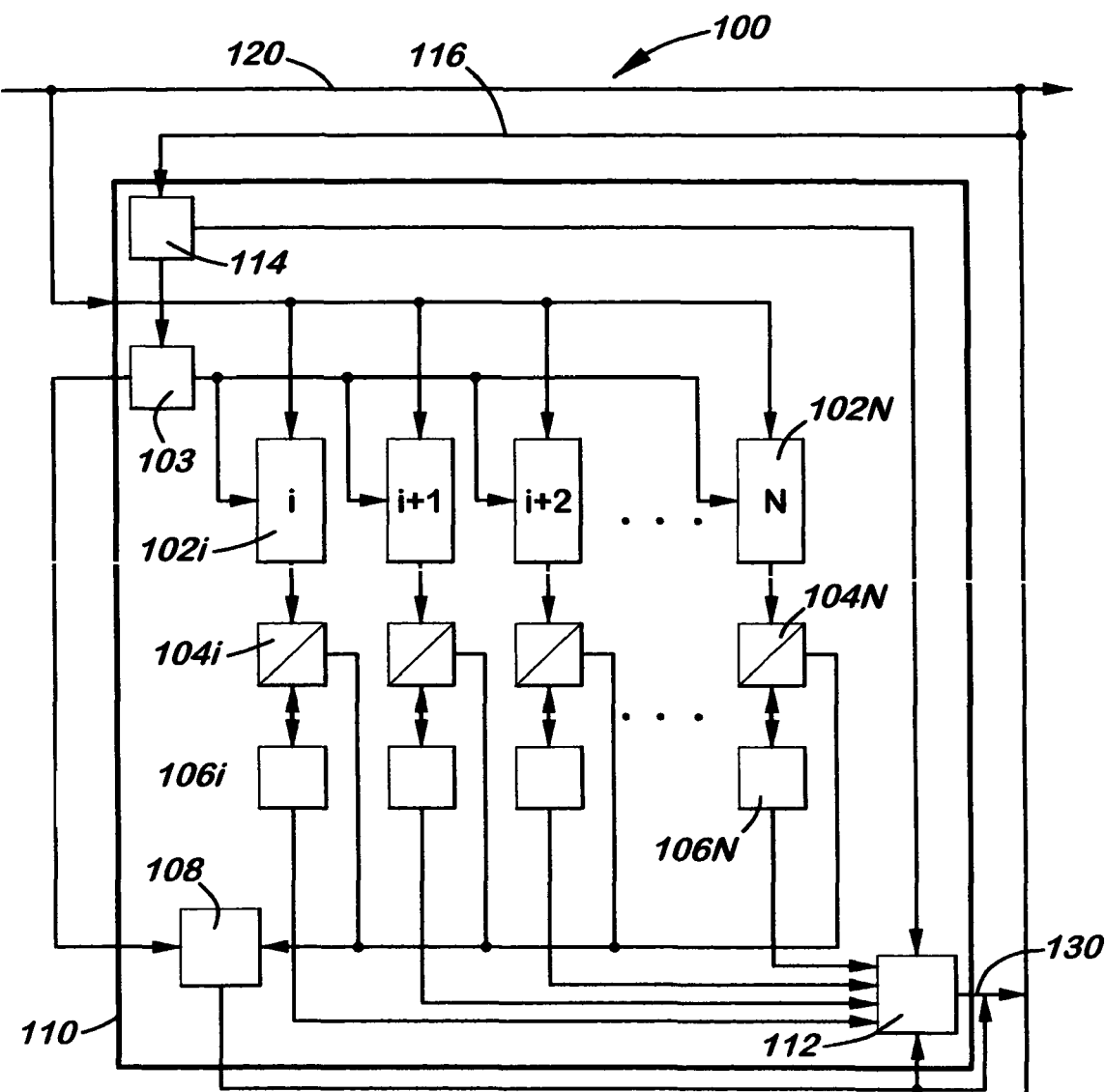
FIG. 1 is a block diagram illustrating a system according to one embodiment of the invention.
Figure 1:
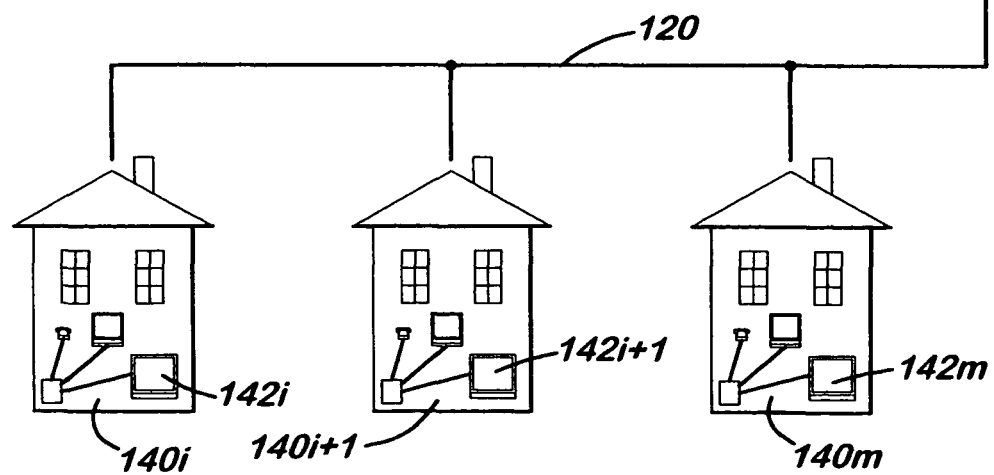

In the following detailed description, reference is made to the accompanying drawings that form a part hereof, and in which are shown by way of illustration specific embodiments in which the invention, as claimed, may be practiced. The invention may, however, be embodied in many different forms and should not be construed as limited to the embodiments set forth; rather, these embodiments are provided so that this disclosure will be thorough and complete, and will fully convey the scope of the invention to those skilled in the art. In the drawings, like numerals indicate like parts.

FIG. 1 shows a block diagram of a preferred embodiment of a system 100 for improved channel surfing, according to the present invention. System 100 is designed to improve channel surfing for subscribers $140_i$ to $140_M$ in a broadband broadcast network environment such as a cable television or satellite system. System 100 shares the resources of server 110 in a multi-subscriber or multi-user environment. Essentially, system 100 provides subscribers surfing to a channel presently running commercials with a segment of buffered program content taken just before the commercial segment began in lieu of the commercials.

System 100 includes a central server 110 coupled to a broadband high speed cable at an input port 120 such as a fiber, hybrid or coaxial cable of a content provider such as a cable television or broadband telecommunications network. The broadband feed at input port 120 delivers broadcast content including programs and services to subscribers $140_i$ to $140_M$ in a number of channels that may be multiplexed by frequency, time, code, etc., and may include digital and analog "cable," "satellite" and "over-the-air" audio and video content, such as Standard Definition Television (SDTV), digital television (DTV), high definition television (HDTV), satellite digital radio, and the like, as well as advanced services such as videoconferencing, private networking, telephony, video-on-demand (VoD), "datacasting," Internet, and pay-per-view streaming media. In other embodiments of the present invention, broadband feed at input port 120 may simply be a direct feed from one or more terrestrial or satellite community antenna systems serving subscribers $140_i$ to $140_M$. The term "channel" as used herein, refers to any separate path through which signals can flow and may be defined by one or more signal properties including frequency, wavelength, time, codes, packets, and other identifiers may be used to distinguish one signal from another in a communication system.

Server 110 includes a bank of auxiliary tuners $102_i$ to $102_N$, each tuned to receive and demodulate a channel of broadcast content carried on the broadband feed at input port 120 and to provide baseband information for the channel. The term "baseband information" as used herein includes all digital or analog communications signals, including audio, video and data content in the frequency band occupied by the signals before being combined or multiplexed for transmission with other channels over the broadband feed received at input port 120. The baseband information output from auxiliary tuners $102_i$ to $102_N$ is selectively coupled to channel buffers $106_i$ to $106_N$ through commercial detectors $104_i$ to $104_N$. Server 110 may include an auxiliary tuner for each channel received at input port 120, however, a smaller number of auxiliary tuners may be employed in some embodiments, as will be discussed below.

Each auxiliary tuner $102_i$ is tuned by a channel selector 103 to receive a different analog or digital channel i. Channel selector 103 is controlled by a controller 114 that receives information concerning channel selection and channel surfing habits from subscribers $140_i$ to $140_M$. The baseband information output from auxiliary tuners $102_i$ to $102_N$ is coupled to commercial detectors $104_i$ to $104_N$ which look for indicia of commercials and may mark the commercial segments for deletion in the buffered content, or may cause the feed to channel buffers $106_i$ to $106_N$ to be interrupted whenever commercials are detected in time to avoid loading to the buffer. Commercial detectors $104_i$ to $104_N$ also generally provide commercial status information such as a signal to indicate that a commercial segment is running (or is not running) in the baseband channel information for each channel i. The commercial status information may be held in a commercial status register 108. In some embodiments a simple flag may be used to indicate that commercials are running presently on a channel; in other embodiments timing information may be included to better identify when commercials are present in the information stream and when the program segment will again resume (or may be expected to resume) on a given channel.

The baseband channel information for each channel i is provided by channel buffers $106_i$ to $106_N$ to a multiplexer (MUX)/upconverter modulator 112. MUX upconverter modulator 112 functions as a switch to select one or more of the N buffered channels to broadcast downstream to subscribers $140_i$ to $140_M$ in a buffered feed provided at downstream output port 130. In some embodiments it may be possible for the live feed for channels presently running commercials to be interrupted or filtered from the broadband multiplexed transmission provided downstream of server 110 to subscribers $140_i$ to $140_M$ and the buffered channel content may be switched in to replace the live feed until the commercial segment has concluded. In general, however, it will not be possible to interfere with the multiplexed transmission provided to subscribers $140_i$ to $140_M$ on the broadband feed received at input port 120 and excess bandwidth will need to be used. For example, the buffered feed at downstream output port 130 may be provided on one or more unused channels or out of band slots according to methods familiar to those of skill in the art. Signal resolution in the buffered feed of downstream output port 130 may optionally be lowered or signal compression employed to reduce bandwidth requirements and/or improve transmission speed.

The commercial status information from commercial status register 108 may also be broadcast to subscribers $140_i$ to $140_M$ over the buffered feed at downstream output port 130 and may be used to determine when to switch subscriber broadcast receivers $142_i$ to $142_M$ from the live channel feed provided over the broadband feed received at input port 120 to the buffered feed at downstream output port 130.

Figure 2:
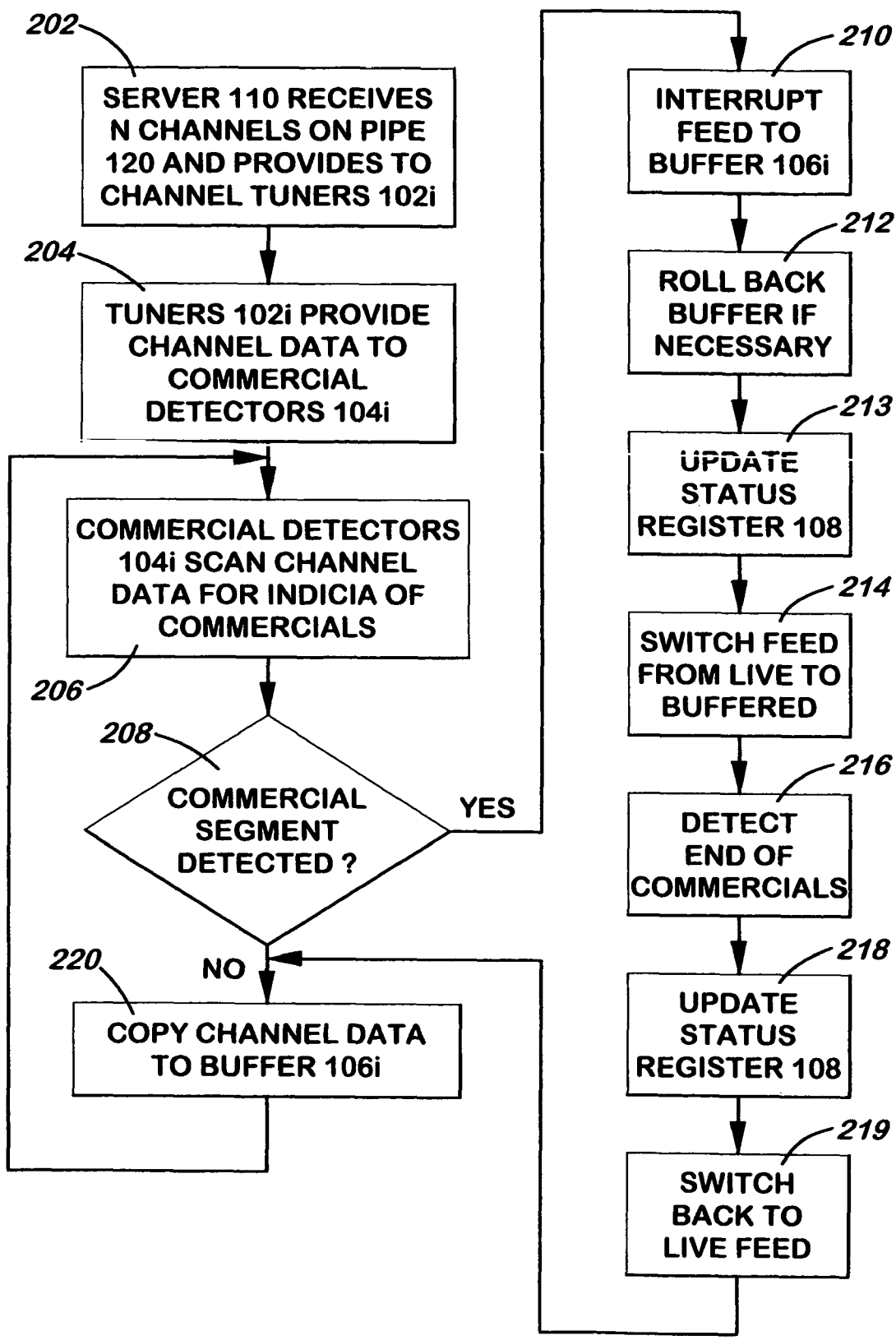
FIG. 2 is a flow diagram illustrating a method according to a one embodiment of the invention.

FIG. 2 shows a simplified flow chart of the operation of system 100. In operation, server 110 receives a broadband signal comprising multiple channels of broadcast content information such as audio, video or multimedia content over the broadband feed received at input port 120 and provides the same to a plurality of auxiliary tuners $102_i$ to $102_N$ which receive and demodulate the broadcast channels and output baseband channel information for each N channel (block 202). The baseband channel information for each N channel is provided to a commercial detector $104_i$ (block 204) which scans the data for indicia of commercials (block 206). When an indication of a commercial such as the beginning of a commercial segment is detected, for example on channel i, commercial detector $104_i$ will interrupt the feed to the buffer $106_i$ (block 210). In some embodiments commercial detector $104_i$ may be unable to identify commercials in the baseband channel information "on the fly" and may need to scan the baseband channel information for a period of time to obtain reliable indicia of commercial segments. If any of the commercial segment is inadvertently copied to the buffer, the buffer $106_i$, may be rolled back to delete any of the commercial segment (block 212).

When an indication of a commercial is detected on a channel i, commercial detector $104_i$ updates status register 108 (block 213). The status register data 108 and channel select data from controller 114 determine whether the buffered feed for channel i is selected by mux upconverter modulator 112 for transmission downstream over buffered feed at downstream output port 130. The commercial status information from commercial status register 108 may also be used to configure broadcast receivers $142_i$ to $142_M$ to switch from the live channel feed to the buffered feed provided at downstream output port 130 for channel i (block 214). Preferably the broadcast receiver will provide an indication for the user (such as a message on a display, or an indicator light, etc.) that buffered content is being provided whenever a user surfs to a channel presently running buffered feed. When the end of the commercial segment has been detected (block 216), the status register 108 is updated (block 218) and broadcast receivers $142_i$ to $142_M$ are switched back to live feed. Buffer $106_i$ may resume copying program data (block 219). The commercial detector $104_i$ monitors the baseband channel information for the beginning of the next commercial segment and/or indicia of commercials.

In general, the amount of program content stored in buffers $106_i$ to $106_N$ will depend on whether the buffered program content should cover the entire length of the commercial segment or a portion thereof, and on the length of commercial segments. Commercial segment sizes may vary from channel to channel and may depend on the time of day. In some embodiments, buffer sizes may be dynamically allocated based on experience. For example, buffer sizes could be varied to correspond to the average length of commercial segments encountered for a particular channel and/or a particular time slot.

As noted, in some embodiments, server 110 may provide a sufficient number of auxiliary tuners $102_i$ to enable simultaneous monitoring, commercial detection and buffering of each of the N channels of broadcast content or other information from the broadband feed received at input port 120. However, it will generally be preferable to monitor and buffer a smaller number of channels. Data concerning subscriber channel surfing may be used to limit the number of auxiliary tuners $102_i$ and the amount of bandwidth needed for buffered feed at downstream output port 130. For example, subscriber channel selection information may be received on a channel select port 116 to a controller 114 of server 110 which may determine which channels to select for auxiliary tuners $102_i$ to $102_N$ and which to select for transmission over the buffered feed provided at downstream output port 130 based on subscriber surfing habits and current channel selections, for example.

If buffered content is only provided for sequential channel selections (i.e., channel up or channel down), and/or is based on a history of surf channel selections, for example, the number of auxiliary tuners and corresponding bandwidth required for the buffered feed provided at downstream output port 130 may be reduced. For example, if the channels currently selected by each subscriber 140 are provided to controller 114, it can select a plurality of adjacent surf channels (i.e., channels immediately above and below the channel currently selected) for each subscriber and provided those channel selections to channel selector 103 so that auxiliary tuners $102_i$ to $102_N$ will be set to those channels. In addition, controller 114 may record the historical surfing habits of each subscriber 140 and cause the channel selector 103 to select one or more additional frequently selected surf channels. Channels that do not need to be buffered because they do not run commercial segments may be placed on a no buffering list so that system resources are not needlessly devoted to those channels.

While FIG. 1 shows a commercial detector $104_i$ and channel buffer $106_i$ coupled to the output of each auxiliary tuner $102_i$, in alternative embodiments, a commercial detector $104_i$ and channel buffer $106_i$ may be selectively coupled to and shared by multiple auxiliary tuners $102_i$. For example, a commercial detector $104_i$ in some embodiments may scan a number of channels to detect commercials. In other embodiments, one or more auxiliary tuners $102_i$ may be tasked to commercial detection while others are tasked to providing content for buffering. For example, one or more auxiliary tuners $102_i$ may continuously scan multiple channels to detect commercials and provide updates to status register 108 to reflect which channels are presently running commercials. Using the data from status register 108 together with subscriber channel selection, other auxiliary tuners $102_i$ may be set to channels on which program content is currently detected and provide the program content to channel buffers $106_i$.

Figure 4:
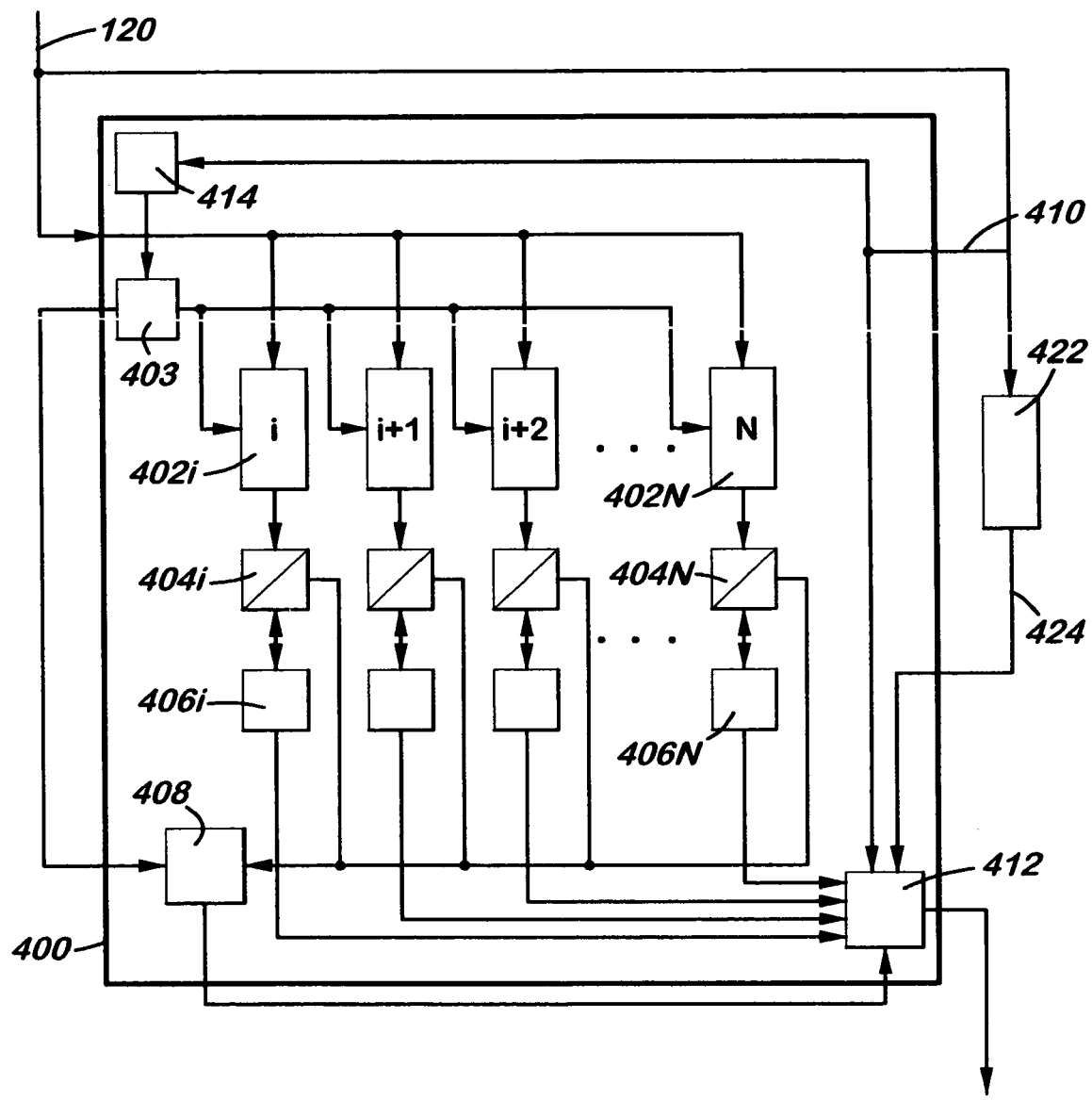
FIG. 4 is a block diagram illustrating a system according to yet another embodiment of the invention.

FIG. 4 shows an embodiment of a system 400 that may be incorporated into the design of a broadcast receiver or a set top box intended for a single subscriber or household. System 400 provides segments of buffered program content in lieu of commercial segments while channel surfing. System 400 includes a bank of auxiliary tuners $402_i$ to $402_N$, each tuned to receive and demodulate a channel of broadcast content included in the broadband feed received at input port 120 and to provide baseband information for the channel. The baseband information output from auxiliary tuners $402_i$ to $402_N$ is selectively coupled to channel buffers $406_i$ to $406_N$ through commercial detectors $404_i$ to $404_N$. Each auxiliary tuner $402_i$ is tuned by a channel selector 403 to receive and monitor a different analog or digital channel i. A controller 414 determines the channels to select for tuners $402_i$ to $402_N$ based on channel select information 410 which includes the channel selected by the primary broadcast tuner 402. For example, controller 414 may select one or more channels immediately above and below the channel currently selected by the primary broadcast tuner 422. In addition, controller 414 may use a history of the channels selected by the primary broadcast tuner 422.

The baseband information output from auxiliary tuners $402_i$ to $402_N$ is coupled to commercial detectors $404_i$ to $404_N$ which look for indicia of commercials and may mark the commercial segments for deletion in the buffered content, or may cause the feed to channel buffers $406_i$ to $406_N$ to be interrupted whenever commercials are detected in time to avoid loading to the buffer. Commercial detectors $404_1$ to $404_N$ also generally provide commercial status information such as a signal to indicate the presence (or absence) of a commercial in the baseband channel information for each channel i. The commercial status information may be held in a commercial status register 408.

The baseband channel information for each channel i is provided by channel buffers $406_1$ to $406_N$ to a multiplexer 412. The live feed baseband information 424 output by primary broadcast tuner 402 may also be input to MUX 412. MUX 412 selects between the live feed 424 and baseband information for one of the N buffered channels based on commercial status register 408 and on channel select signal 410. In this example, when a channel select signal 410 changes to a new channel that has a status in register 408 indicating that channel is running commercials, MUX 412 immediately switches from the live feed 404 to a buffered feed for that channel. When the status changes back to indicate that no commercial is presently detected for that channel, MUX 412 resumes the live feed 424 for that channel.

Figure 3:
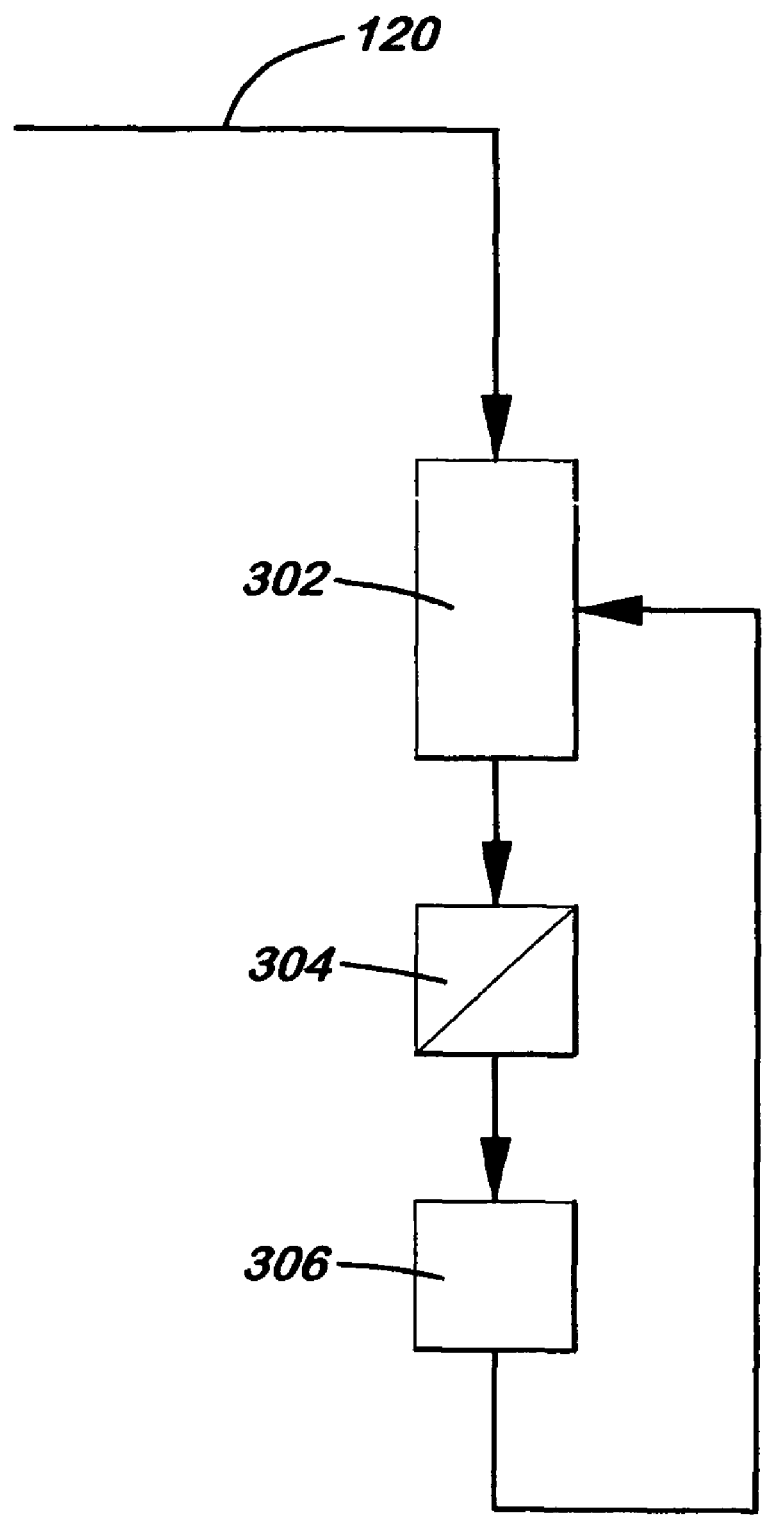
FIG. 3 is a block diagram illustrating a system according to another embodiment of the invention.

FIG. 3 shows an alternative embodiment of a system 300 according to the present invention. System 300 implements an "express channel surf" feature. System 300 simply attempts to remove any channels from the selection of available channels during the interval that the channels are currently running commercials so that they will be automatically skipped over during channel surfing and does not attempt to provide buffered content. System 300 includes a scanning auxiliary tuner 302 which is coupled to the broadband feed received at input port 120 and which outputs baseband channel information to a commercial detector 304. Commercial detector 304 briefly monitors the baseband channel data to look for one or more indicia of commercials and decides whether a commercial is running on the presently tuned channel. Commercial detector 304 may, in some embodiments include a buffer to store segments of baseband channel information that can be examined for commercial indicia.

The present "commercial running" status of each channel is recorded in express channel surf register 306. Scanning auxiliary tuner 302 repeatedly scans through the surf channels to update the status of the register 306. When a viewer selects "express channel surf" feature, all channels having a "commercial running" status in express channel surf register 306 are automatically skipped over in the selection of channels so that the viewer will not be annoyed with commercials when channel surfing. In general, the quality of the status information provided by the express channel surf register 306 will depend on how rapidly the system 300 is able to update the register. In some embodiments, more than one scanning auxiliary tuner 302 may be used in parallel to scan subsets of surf channels to speed up the process.

Commercials can be identified and eliminated from an audio or video data stream in a number of different ways. Embodiments of the present invention are not limited to any one method of detection. In a simple example, a television viewer will observe a video or audio cue that a commercial segment is about to begin in a prerecorded or buffered video stream and manually advance the recorded video stream by a predetermined length, such as 15, 30, 45 or 60 seconds, depending, for example, on how many times a button is pressed.

Various automated audio and video content analysis techniques may be used to gather commercial indicia and identify commercials or commercial segments from video and audio cues that typically start, end, and characterize the content of commercial segments. For example, commercial segments have traditionally been preceded and following by blank frame transitions which can be detected and used to identify the start and end of commercial segments. Other methods rely on detecting audio and video characteristics and correlating the characteristics to program content. For example, commercial segments can be identified algorithmically by techniques such as shot boundary detection (SBD), scene change detection, the occurrence of text regions, changes in audio amplitude or audio frequency spectrum, color changes, motion vector analysis, edge tracking and, and the like. Models of one or more video or audio characteristics can be established and used to identify and distinguish different kinds of video data and to mark program content transitions and can be used to such as commercials and programming. In some embodiments, users may iteratively retrain a commercial detector that employs a heuristic pattern recognition algorithm to improve detection by manually identifying commercials from program content and allowing the system to scan for indicia that best distinguishes the commercials from program content.

For a number of years, television broadcast signals have been configured to carry a stream of data in the baseband channel information in addition to the standard audio and video of the broadcast. It is increasingly common to find such ancillary data broadcast in a channel along with audio and video content. For example, a data stream may be carried in a conventional analog TV signal in the interval between frames of video (i.e., the vertical blanking interval (VBI)). In North America, for example, the VBI is provided at lines 10 through 21 of an analog video signal. Line 21 has been reserved by the Federal Communications Commission (FCC) for transmission of ancillary data including closed captioning channels (CC1-CC4), text transmission channels (TEXT1-TEXT4), and eXtended Data Services (XDS) data, including the "V-chip" program content ratings, Station Name, Station ID, Network name, Program Name, Program Type, Program Description, Time of Day, and Time in Show, Interactive TV triggers, for example. XDS data packets are encoded according to Electronic Industries Association specification Nos. EIA-608 (for analog TV), incorporated herein by reference. Corresponding and somewhat expanded standards have been established for digital TV (DTV) as EIA-708 and Program and System Information Protocol (PSIP), defined by the Advanced Television Systems Committee (ATSC) A/65 standard, also incorporated herein by reference.

While not all television programs include ancillary data such as closed captioning, XDS data, and the like, most do, the ancillary data will vary depending on the program content. In particular, the ancillary data during regular programming will typically be different from ancillary data during commercials and such differences may be used to identify and distinguish commercial segments from regular programming. In some examples, the identification may be simple. For example, a V-chip rating for a rated program is continuously transmitted during the program but is turned off during commercials because commercials are not rated. Likewise, closed captioning is often present during a program segment but may not be present during commercials. In other examples, a combination of different types of ancillary data may need to be examined to distinguish between commercial segments and regular programming. In still other examples, ancillary data might be used in a heuristic pattern recognition algorithm to learn to distinguish between commercial segments and regular programming. Ancillary data may also be combined with other characteristics and indicia in some embodiments to improve detection of commercial segments. In other embodiments, such ancillary data detection may be selectively engaged as an "express" commercial skip feature, or the like. The present invention is not limited to any particular system or method of detection of commercials and commercial segments.

CONCLUSION

As has been shown, embodiments of the present invention provide systems and methods for efficiently and rapidly navigating through multiple channels of broadcast content in order to locate channels that are running programs of interest. Systems according to the present invention may be used in a broadcast network environment or may be used in connection with a single broadcast receiver. A number of embodiments of the invention defined by the following claims have been described. Nevertheless, it will be understood that various modifications to the described embodiments may be made without departing from the spirit and scope of the claimed invention. For example a variety of circuitry and components may be implemented in software, firmware, hardware, or combinations thereof. In addition, while various embodiments of the present invention have been described in terms of television broadcasts, embodiments of the present invention apply to other broadcast content and information such as radio, on demand programming, internet streaming media, and the like.

What is claimed is:

1. A system for navigating through multiple channels of broadcast content to locate channels that are running programs of interest comprising;
   an input port to receive a broadband source comprising multiple channels of broadcast content;
   a plurality of auxiliary tuners coupled to the input port to select and demodulate channels of broadcast content and to output baseband information for the channels;
   a commercial detector coupled to the baseband information of at least one channel, the commercial detector to provide a commercial status signal to indicate whether a commercial segment is running on the at least one channel;
   a channel buffer to provide a buffered feed of the baseband channel information of the at least one channel;
   an output port; and
   a switch to selectively couple the buffered feed of the baseband channel information for the at least one channel to the output port in response to the commercial status signal,
   wherein if a beginning of the commercial segment is detected by the commercial detector, feed to the channel buffer is interrupted;
   wherein if any of the commercial segments is inadvertently recorded to the channel buffer, which is indicated by the commercial status signal obtained from scanning the baseband channel information for a predetermined period of time, the buffered feed is rolled back to delete any inadvertently recorded commercial segments;
   wherein a size of the channel buffer is varied to correspond to an average length of the commercial segments encountered for a particular channel and a particular time slot.

2. The system of claim 1 wherein the buffered feed of the baseband channel information for the at least one channel is modulated and upconverted for transmission over one or more channels of the broadband source.

3. The system of claim 1 further comprising a status register to store commercial status information that includes the commercial status signals for a plurality of channels.

4. The system of claim 1 further comprising a controller to select channels for the plurality of auxiliary tuners.

5. The system of claim 4 wherein the controller selects channels for the plurality of auxiliary tuners based on channel select information from at least one broadcast receiver.

6. The system of claim 3 wherein the commercial status information is provided to a plurality of broadcast receivers in a broadband subscriber network.

7. The system of claim 1 wherein at least one tuner is tasked to scan a plurality of channels.

8. The system of claim 7 wherein at least one tuner is tasked to provide baseband channel information for the channel buffer.

9. The system of claim 1 wherein the switch decouples the buffered feed from the output port when the status signal indicates a commercial segment is no longer running.

10. The system of claim 1 wherein the commercial detector employs a pattern recognition algorithm to determine whether a commercial segment is running on the at least one channel.

11. The system of claim 10, wherein the pattern recognition algorithm may be trained to recognize commercial segments.

12. A method for improved channel surfing, comprising:
   monitoring a plurality of channels of baseband channel information to detect commercials;
   buffering the baseband channel information for at least one channel to store in a channel buffer;
   varying a buffer size to correspond to an average length of commercial segments encountered for a particular channel and a particular time slot;
   interrupting buffering of the baseband channel information if a beginning of the commercial segment is detected;
   rolling back the buffered baseband channel information for deleting any inadvertently recorded commercial segments if any of the commercial segments is inadvertently recorded, which is indicated by a commercial status signal obtained from scanning the baseband channel information for a predetermined period of time; and
   switching the channel feed for a broadcast receiver to the buffered baseband channel information whenever the receiver is changed to a channel in which commercials are detected.

13. The method of claim 12 further comprising storing commercial status information for the plurality of channels.

14. A broadcast receiver, comprising:
   a plurality of auxiliary tuners to select and demodulate channels of broadcast content from a multichannel broadband source and to output baseband channel information for the channels;
   a commercial detector coupled to the baseband channel information of at least one channel, the commercial detector to provide a commercial status signal to indicate whether a commercial segment is running on the at least one channel;
   a channel buffer to provide a buffered feed of the baseband channel information for the at least one channel;
   a primary tuner to select and demodulate a channel from the multichannel broadband source and to provide a primary feed of baseband channel information; and
   a switch to selectively couple the buffered feed of the baseband channel information to replace the primary feed of baseband channel information in response to a commercial status signal indicating that a commercial is running on a channel to which the primary tuner has been changed, wherein if a beginning of the commercial segment is detected by the commercial detector, feed to the channel buffer is interrupted;

wherein if any of the commercial segments is inadvertently recorded to the channel buffer, which is indicated by the commercial status signal obtained from scanning the baseband channel information for a predetermined period of time, the buffered feed is rolled back to delete any inadvertently recorded commercial segments;

wherein a size of the channel buffer is varied to correspond to an average length of the commercial segments encountered for a particular channel and a particular time slot.

15. The system of claim 14 further comprising a status register to store commercial status information comprising the commercial status signals for a plurality of channels.

16. The system of claim 14 wherein the commercial detector scans a plurality of channels.

17. The system of claim 14 wherein at least one auxiliary tuner scans a plurality of channels.

18. An apparatus comprising:
a scanning tuner to selectively receive and demodulate a plurality of broadcast channel and to provide baseband channel information for the selected channels;
a commercial detector coupled to the baseband channel information for the selected channels to distinguish between commercial segments and regular programming and to provide commercial status signals for the selected channels;
means for buffering the baseband channel information while the commercial status signals have not being received;
means for selectively coupling a buffered feed of the baseband channel information to replace a primary feed of baseband channel information in response to the commercial status signals indicating that a commercial is running; and
a register to record commercial status information comprising the commercial status signals,
wherein if any of the commercial segments is inadvertently recorded to a channel buffer, which is indicated by a commercial status signal obtained from scanning the baseband channel information for a predetermined period of time, the buffered feed is capable of rolling back to delete any inadvertently recorded commercial segments;
wherein a size of the channel buffer is varied to correspond to an average length of the commercial segments encountered for a particular channel and a particular time slot.

19. The apparatus of claim 18, wherein the commercial status information is employed to skip over channels running commercials while channel surfing.

20. The apparatus of claim 19, further comprising an activation switch on a user remote control for a broadcast receiver to selectively enable skipping over channels running commercials while channel surfing.

21. The apparatus of claim 18, wherein the commercial detector distinguishes between commercial segments and regular programming by detecting changes in baseband channel information.

22. The apparatus of claim 21, wherein the changes in baseband channel information comprise changes in ancillary data.

23. The apparatus of claim 22, wherein the changes in ancillary data comprise changes in eXtended Data Services (XDS) data.

24. The apparatus of claim 23, wherein the changes in XDS data comprise changes in "V-chip" data.

25. The apparatus of claim 18, wherein the commercial detector employs a pattern recognition algorithm to distinguish between commercial segments and regular programming.

26. The apparatus of claim 25, wherein the pattern recognition algorithm may be trained to recognize commercial segments.

27. A non-transitory storage medium tangibly embodying function for improving channel surfing, the function includes operable instructions to cause at least one programmable processor to:
provide an auxiliary tuner configured to receive and demodulate a plurality of broadcast channels from a broadband source and to output baseband channel information for the channels;
buffer the baseband channel information for at least one channel to store in a channel buffer;
vary a buffer size to correspond to an average length of commercial segments encountered for a particular channel and a particular time slot;
detect and distinguish between the commercial segments and regular programming in the baseband channel information and provide commercial status signals for the channels;
interrupt buffering of the baseband channel information if a beginning of the commercial segment is detected;
delete any inadvertently recorded commercial segments from the buffered baseband channel information if any of the commercial segments is inadvertently recorded to the channel buffer, which is indicated by the commercial status signals obtained from scanning the baseband channel information for a predetermined period of time; and
substitute the buffered baseband channel information for baseband channel information for the channel provided to a broadcast receiver when the commercial segment is detected.

28. A network comprising:
a broadband source comprising multiple channels of broadcast content;
a plurality of broadcast receivers coupled to the broadband source over the network;
a server located upstream of the receivers in the network, comprising:
a plurality of auxiliary tuners coupled to the broadband source to select and demodulate channels of broadcast content and to output baseband information for a plurality of channels;
a commercial detector coupled to the baseband information for the plurality of channels, the commercial detector to provide status signals to indicate whether commercial segments are running on anyone of the plurality of channels;
a channel buffer to provide a buffered feed of the baseband channel information for at least one of the plurality of channels; and
a switch to selectively couple the buffered feed of the baseband channel information for the at least one channel for transmission in a downstream feed to the plurality of broadcast receivers in response to the commercial status signal indicating the commercial segment is running on the at least one channel,
wherein if a beginning of the commercial segment is detected by the commercial detector, feed to the channel buffer is interrupted;

wherein if any of the commercial segments is inadvertently recorded to the channel buffer, which is indicated by the commercial status signal obtained from scanning the baseband channel information for a predetermined period of time, the buffered feed is rolled back to delete any inadvertently recorded commercial segments;

wherein a size of the channel buffer is varied to correspond to an average length of the commercial segments encountered for a particular channel and a particular time slot.

29. The network of claim 28, further comprising a controller to determine channel selections for the plurality of auxiliary tuners.

30. The network of claim 29, wherein the controller determines the at least one channel to select for transmission in the downstream feed to the plurality of broadcast receivers.

31. The network of claim 30, further comprising an upstream link between the broadcast receivers and the server to provide channel select information to the controller.

32. The network Of claim 28 wherein the commercial detector scans a plurality of channels to detect commercials.

33. The network of claim 28 further comprising a status register to store information on which channels are presently running commercials.

34. The network of claim 33 wherein the information from the status register is made available in the downstream feed to the plurality of broadcast receivers.

35. A method for improved channel surfing, comprising:
buffering the program content for a plurality of broadcast channels to store in a channel buffer;
varying a buffer size to correspond to an average length of commercial segments encountered for a particular channel and a particular time slot;
scanning the broadcast channels for a predetermined period of time to detect the commercial segments;
storing channel status information;
interrupting storing of the program content if a beginning of the commercial segment is detected;
deleting any inadvertently commercial segments from the stored program content if any of the commercial segments is inadvertently recorded, which is indicated by a commercial status signal obtained from scanning the broadcast channels for a predetermined period of time; and
switching to the stored program content for a channel during channel surfing whenever status information indicates commercials are detected on the channel.

36. The system of claim 1, wherein the switch is configured to couple to said buffered feed in response to detecting a channel change to view a channel in which commercials are detected as indicated by the commercial status signal.

37. The system of claim 14, wherein the switch is configured to couple to said buffered feed in response to detecting a channel change to view a channel in which commercials are detected as indicated by the commercial status signal.

38. The network of claim 28, wherein the switch is configured to couple to said buffered feed in response to detecting a channel change to view a channel in which commercials are detected as indicated by the commercial status signal.

39. The system of claim 1, wherein the switch is configured to couple the buffered feed of the baseband channel information for the at least one channel to the output port in response to the commercial status signal, and is further configured to couple a live feed of the baseband channel information for the at least one channel to the output port in response to a lack of the commercial status signal.

40. The method of claim 12, further comprising:
switching the channel feed for said broadcast receiver to live baseband channel information in response to no commercials being detected.

41. The network of claim 28, wherein the switch is configured to couple the buffered feed of the baseband channel information for the at least one channel to the plurality of broadcast receivers in response to the commercial status signal, and is further configured to couple a live feed of the baseband channel information for the at least one channel to the plurality of broadcast receivers in response to a lack of the commercial status signal.

42. The method of claim 35, wherein said switching to the buffered program content comprises switching from a live feed to the buffered program content.

* * * * *